US010462124B2

United States Patent
Kong et al.

(12) United States Patent
(10) Patent No.: US 10,462,124 B2
(45) Date of Patent: Oct. 29, 2019

(54) AUTHENTICATED SESSION MANAGEMENT ACROSS MULTIPLE ELECTRONIC DEVICES USING A VIRTUAL SESSION MANAGER

(71) Applicant: Google LLC, Mountain View, CA (US)

(72) Inventors: Guibin Kong, Fremont, CA (US); Naveen Agarwal, Los Altos, CA (US)

(73) Assignee: Google LLC, Mountain View, CA (US)

( * ) Notice: Subject to any disclaimer, the term of this patent is extended or adjusted under 35 U.S.C. 154(b) by 143 days.

(21) Appl. No.: 15/395,541

(22) Filed: Dec. 30, 2016

(65) Prior Publication Data

US 2018/0191701 A1   Jul. 5, 2018

(51) Int. Cl.
H04L 29/06   (2006.01)

(52) U.S. Cl.
CPC ........ H04L 63/083 (2013.01); H04L 63/0853 (2013.01)

(58) Field of Classification Search
CPC .......................... H04L 63/0853; H04L 63/083
See application file for complete search history.

(56) References Cited

U.S. PATENT DOCUMENTS

| | | | |
|---|---|---|---|
| 6,161,182 A | 12/2000 | Nadooshan | |
| 6,609,198 B1 | 8/2003 | Wood et al. | |
| 7,145,898 B1 | 12/2006 | Elliott | |
| 7,174,383 B1 | 2/2007 | Biswas et al. | |
| 7,895,445 B1 | 2/2011 | Albanese et al. | |
| 7,979,555 B2 | 7/2011 | Rothstein et al. | |
| 8,032,922 B2 | 10/2011 | Bhatia et al. | |
| 8,346,967 B2 | 1/2013 | Jones | |
| 8,478,693 B1 | 7/2013 | Weigle et al. | |
| 8,505,085 B2 | 8/2013 | Logan et al. | |
| 8,607,306 B1 | 12/2013 | Bridge et al. | |
| 8,621,201 B2 | 12/2013 | Costa et al. | |

(Continued)

FOREIGN PATENT DOCUMENTS

WO   2015126124 A1   8/2015

OTHER PUBLICATIONS

Albuquerque, Paulo, "Implementing OAuth 2 with Oracle Access Manage OAuth Services (Part V)" Sep. 30, 2015, available at http://www.ateam-oracle.com/implementing-oauth-2-with-oracle-access-manager-oauth-services-part-v/ printed on Dec. 1, 2016.

(Continued)

*Primary Examiner* — Tri M Tran
(74) *Attorney, Agent, or Firm* — Lerner, David, Littenberg, Krumholz & Mentlik, LLP

(57) ABSTRACT

A virtual session manager of an electronic device maintains a web session for a user across multiple electronic devices. The virtual session manager will receive an authentication request from a first electronic device that is in a communication range of the virtual session manager's device. The virtual session manager will transmit the authentication request to an endpoint device, and it will either present a grant token to or receive a grant token from the endpoint. The virtual session manager will receive a first access token from the endpoint device. The virtual session manager will transmit the first access token to the first electronic device so that the first electronic device can establish a virtual session with the first web resource without having any access to the grant token.

22 Claims, 8 Drawing Sheets

(56) References Cited

U.S. PATENT DOCUMENTS

| | | |
|---|---|---|
| 8,656,472 B2 | 2/2014 | McMurtry et al. |
| 8,800,009 B1 | 8/2014 | Beda et al. |
| 8,850,037 B2 * | 9/2014 | McDonough ........... H04L 67/02 709/220 |
| 8,881,250 B2 | 11/2014 | Yefimov et al. |
| 8,935,757 B2 | 1/2015 | Srinivasan et al. |
| 9,106,642 B1 | 8/2015 | Bhimanaik |
| 9,118,657 B1 | 8/2015 | Shetty |
| 9,130,926 B2 | 9/2015 | Nori et al. |
| 9,178,868 B1 | 11/2015 | Leung et al. |
| 9,178,875 B2 | 11/2015 | Lu et al. |
| 9,203,620 B1 | 12/2015 | Nystrom |
| 9,231,935 B1 | 1/2016 | Bridge et al. |
| 9,241,269 B1 | 1/2016 | Giridharan et al. |
| 9,294,484 B2 | 3/2016 | Fukuda et al. |
| 9,325,696 B1 | 4/2016 | Balfanz et al. |
| 9,350,728 B2 | 5/2016 | Lu et al. |
| 9,363,254 B2 | 6/2016 | Beckhardt et al. |
| 9,397,990 B1 | 7/2016 | Taly et al. |
| 9,674,699 B2 | 6/2017 | Kanov et al. |
| 9,819,665 B1 | 11/2017 | Machani |
| 9,819,672 B1 | 11/2017 | Machani |
| 10,091,204 B1 | 10/2018 | Triandopoulos et al. |
| 10,200,357 B2 | 2/2019 | Grajek et al. |
| 2003/0182242 A1 | 9/2003 | Scott et al. |
| 2004/0098595 A1 | 5/2004 | Aupperle et al. |
| 2005/0154923 A1 | 7/2005 | Lok et al. |
| 2005/0204148 A1 | 9/2005 | Mayo et al. |
| 2006/0026260 A1 | 2/2006 | Mullen et al. |
| 2006/0236105 A1 * | 10/2006 | Brok ................... H04W 12/06 713/169 |
| 2006/0294192 A1 | 12/2006 | Mao et al. |
| 2007/0289002 A1 | 12/2007 | van der Horst et al. |
| 2009/0193507 A1 | 7/2009 | Ibrahim |
| 2009/0217048 A1 | 8/2009 | Smith |
| 2010/0011391 A1 | 1/2010 | Carpenter et al. |
| 2010/0306668 A1 | 12/2010 | Williams, III et al. |
| 2011/0271099 A1 | 11/2011 | Preiss et al. |
| 2012/0054847 A1 | 3/2012 | Schultz et al. |
| 2012/0254957 A1 | 10/2012 | Fork et al. |
| 2012/0260322 A1 | 10/2012 | Logan et al. |
| 2012/0266229 A1 | 10/2012 | Simone et al. |
| 2013/0054968 A1 | 2/2013 | Gupta |
| 2013/0179961 A1 | 7/2013 | Abe |
| 2013/0221083 A1 | 8/2013 | Doss et al. |
| 2013/0252583 A1 | 9/2013 | Brown et al. |
| 2013/0268687 A1 * | 10/2013 | Schrecker ............. H04W 12/06 709/229 |
| 2014/0026193 A1 * | 1/2014 | Saxman ................. G06F 21/33 726/4 |
| 2014/0075513 A1 | 3/2014 | Trammel et al. |
| 2014/0123236 A1 | 5/2014 | Hirata |
| 2014/0173695 A1 | 6/2014 | Valdivia |
| 2014/0181944 A1 | 6/2014 | Ahmed et al. |
| 2014/0223516 A1 | 8/2014 | Vongsouvanh et al. |
| 2014/0230020 A1 | 8/2014 | Mogaki |
| 2014/0237580 A1 | 8/2014 | Kato |
| 2014/0282986 A1 | 9/2014 | Leung et al. |
| 2014/0317187 A1 | 10/2014 | Tsujimoto |
| 2014/0380428 A1 | 12/2014 | Kobayashi |
| 2015/0089569 A1 | 3/2015 | Sondhi et al. |
| 2015/0089614 A1 | 3/2015 | Mathew et al. |
| 2015/0180863 A1 | 6/2015 | Kobayashi |
| 2015/0207790 A1 | 7/2015 | Lu et al. |
| 2015/0281222 A1 | 10/2015 | Burch et al. |
| 2015/0334049 A1 | 11/2015 | Miura |
| 2015/0341347 A1 | 11/2015 | Kong et al. |
| 2015/0350186 A1 | 12/2015 | Chan et al. |
| 2015/0365348 A1 | 12/2015 | Matsuda |
| 2016/0028737 A1 | 1/2016 | Srinivasan et al. |
| 2016/0044035 A1 | 2/2016 | Huang |
| 2016/0065579 A1 | 3/2016 | Chen et al. |
| 2016/0071094 A1 | 3/2016 | Krishnaiah et al. |
| 2016/0080383 A1 | 3/2016 | Hockings et al. |
| 2016/0099924 A1 | 4/2016 | Mehta et al. |
| 2016/0105420 A1 | 4/2016 | Engan et al. |
| 2016/0164920 A1 | 6/2016 | Borovoy et al. |
| 2016/0205108 A1 | 7/2016 | Si et al. |
| 2016/0259936 A1 | 9/2016 | Mukherjee et al. |
| 2016/0269388 A1 | 9/2016 | Ezell et al. |
| 2016/0350748 A1 | 12/2016 | Pruthi et al. |
| 2016/0359861 A1 | 12/2016 | Manov et al. |
| 2017/0012951 A1 | 1/2017 | Mennes et al. |
| 2017/0099148 A1 | 4/2017 | Ochmanski et al. |
| 2017/0099280 A1 | 4/2017 | Goel et al. |
| 2017/0127276 A1 | 5/2017 | Koo et al. |
| 2017/0132627 A1 | 5/2017 | Phillips et al. |
| 2017/0171201 A1 | 6/2017 | Matsugashita |
| 2017/0178193 A1 | 6/2017 | Jagannath et al. |
| 2017/0195457 A1 | 7/2017 | Smith, II et al. |
| 2017/0317898 A1 | 11/2017 | Candito et al. |
| 2017/0353451 A1 | 12/2017 | Metke et al. |
| 2018/0020005 A1 | 1/2018 | Beiter et al. |
| 2018/0025148 A1 | 1/2018 | Jain et al. |
| 2018/0063108 A1 | 3/2018 | Gargaro et al. |
| 2018/0077143 A1 | 3/2018 | Sridharan et al. |
| 2018/0124068 A1 | 5/2018 | Ruhlen et al. |
| 2018/0176207 A1 | 6/2018 | Malatesha et al. |
| 2018/0191701 A1 | 7/2018 | Kong et al. |
| 2018/0324172 A1 | 11/2018 | Unnikrishnan et al. |
| 2018/0332016 A1 | 11/2018 | Pandey et al. |

OTHER PUBLICATIONS

"Access Tokens—Facebook Login" accessed at https://developers.facebook.com/docs/facebook-login/access-tokens/ printed on Dec. 1, 2016.

White Paper "A How-to Guide to OAuth & API Security with CA Layer 7: Make OAuth Implementation Simple for Your Organization" Feb. 2014, published by CA Technologies.

* cited by examiner

AUTHENTICATED SESSION MANAGEMENT ACROSS MULTIPLE ELECTRONIC DEVICES USING A VIRTUAL SESSION MANAGER

BACKGROUND

In the era of the Internet of Things, and with the proliferation of many different types of human interface devices and user agents, users may desire to shift a session between devices in a seamless manner. For example, a user may have a smart phone, a tablet computing device, an Internet-enabled television, a home voice assistant and one or more Internet-of-Things-enabled appliances in his or her home. The user may want all such devices to log in to a single account at the same time, and operate together as part of a single session.

This is not easily possible with current technologies, as web sessions are currently isolated by user agents. For example, when a user initiates a web browsing session, the Hypertext Transfer Protocol (HTTP) used is mostly stateless and treats each request as an independent transaction that is unrelated to any previous request. Thus, the user must be authenticated to each device as the user switches between devices. This can lead to a poor user experience, especially on mobile devices with small user interfaces in which entry of a passcode can be difficult.

In the prior art, to maintain a stateful session using the HTTP protocol, authentication cookies are commonly used. Authentication cookies are used by web servers to determine whether the user of a particular device is logged in to a session or not, and to identify the account with which the user has been logged in. However, a cookie is not useful for maintaining a session across multiple devices or multiple hosted services.

In addition, in some cases a user may wish to establish or rejoin a session on a device that is not personal to the user. Examples of such devices include public computers in libraries or hotel business centers. However, to preserve the security of the user's account the user may not wish to enter his or her passcode into a public computer.

This document describes methods and systems for securely maintaining a user session across multiple devices.

SUMMARY

In some embodiments, a web session is maintained for a user across multiple electronic devices. A user agent of a first electronic device that is being used by the user will discover a second electronic device that is in a communication range of the first electronic device. The user agent will determine that the second electronic device includes a virtual session manager, and it will receive a first authentication request. The first authentication request will include a request to access a first web resource. The first electronic device will transmit the first authentication request to an endpoint device via the virtual session manager of the second electronic device so that the second electronic device can send the request to the endpoint device. If the request is to start a new session, the virtual session manager will receive a grant taken from the endpoint device. If the request is a request to connect to an existing session, the virtual session manager will present a grant token for the session to the endpoint device. Either way, the first electronic device will not have any access to the grant token. The user agent will then receive, from the virtual session manager of the second electronic device, a first access token in response to the first authentication request. The first access token has a life that is shorter than a life of the grant token, such that the grant token is relatively long-lived and the first access token is relatively short-lived. The user agent will store the first access token in a memory that is accessible to the first electronic device. The user agent will use the first access token to access the first web resource and establish or maintain a virtual session with the first web resource.

In some embodiments, when the user agent receives the first access token from the virtual session manager and the request is to connect to an existing session, the user agent also may receive a history from the virtual session manager. The history will include one or more parameters associated with the user's use of the first web resource when the grant token was previously transmitted to the endpoint device. Then, when accessing the first web resource, the user agent may automatically send the parameters to the first web resource to maintain or automatically reconnect to the virtual session so that the virtual session is uninterrupted without manually entering the parameters.

In some embodiments, the user agent may cause the first electronic device to discover additional electronic devices that are in the communication range of the first electronic device and that each include a virtual session manager. If so, the user agent may cause the first electronic device to present, to a user of the first electronic device, identifiers associated with each of the discovered additional electronic devices, along with an identifier for the second electronic device. The system may then receive, via a user interface, a selection of the second electronic device so that the user agent can then send the first authentication request to the virtual session manager of the second electronic device.

In some embodiments, the virtual session manager may determine that various existing virtual sessions are available for the first web resource, each of which has a corresponding grant token. The virtual session manager may output identifiers for the existing virtual sessions. The virtual session manager may receive, via a user interface of the virtual session manager's electronic device, a selection of one of the virtual sessions. The virtual session manager may then transmit, to the endpoint device with the first authentication request, a request to connect to the selected virtual session. The grant token that the virtual session manager electronic device will present to the endpoint device will be the grant token that corresponds to the selected virtual session. Alternatively, the virtual session manager may receive a request to start a new virtual session rather than connect to any of the available existing virtual sessions. If so, then the virtual session manager of the second electronic device may transmit a request to start the new virtual session to a login endpoint with the first authentication request and receive a new grant token from the login endpoint.

When the virtual session manager of the second electronic device receives a request to start a new virtual session, it may generate a prompt for the user to present an access credential to the second electronic device. The virtual session manager may receive the access credential via a user interface of the second electronic device (i.e., the device that includes the virtual session manager) and confirm that the access credential authorizes the user to access the first web resource. In response to receiving the access credential and confirming that the access credential authorizes the user to access the first web resource, the virtual session manager may transmit the request to start the new virtual session to the endpoint device with the first access request.

In some embodiments, the user agent of the first electronic device may, when the first access token expires or is about to expire, transmit a re-authentication request to the endpoint device via the second electronic device so that the virtual session manager of the second electronic device can present the re-authentication request with the grant token to the endpoint device without the first electronic device or its user agent having any access to the grant token. The user agent may receive an updated access token from the endpoint device via the second electronic device. The updated access token will replace the first access token and will have a life that is shorter than the life of the grant token. The user agent may then use the second access token to maintain the virtual session.

In some embodiments, the virtual session manager of the second electronic device may output an interface via which the user may command the virtual session manager to do one or more of the following: (i) disable the virtual session, in which case the virtual session manager will stop issuing new or updated access tokens for the session; (ii) re-enable a disabled virtual session, in which case the virtual session manager will resume granting new and updated access tokens for the previously disabled virtual session; (iii) re-group a virtual session, in which case the virtual session manager will identify an alternate virtual session for which it has a grant token, send the grant token for the alternate virtual session to the endpoint device, receive an alternate access token from the endpoint device, and transmit the alternate access token to the first electronic device so that the first electronic device will replace the first access token with the alternate access token and use the alternate access token to connect to the alternate virtual session; (iv) delete the virtual session, in which case the virtual session manager will delete the grant token for the virtual session; or (v) remove the first electronic device, in which case the virtual session manager will prevent the user agent from receiving additional access tokens until the virtual session manager receives a valid authentication credential that permits the user agent to reconnect to the virtual session manager.

In some embodiments, the user agent may prompt the user to perform a known user action. In response to detecting the known user action, the user agent will obtain a user presence token, and it will transmit the user presence token to the first web resource with the first access token when establishing the virtual session with the first web resource. This may allow the first web resource to verify the identity of the user.

In other embodiments, a method of maintaining a web session for a user across multiple electronic devices includes, by a virtual session manager of a second electronic device, receiving a first authentication request from a first electronic device that is in a communication range of the second electronic device. The first authentication request will include a request to access a first web resource. The virtual session manager will transmit the first authentication request to an endpoint device. If the request is to establish a new session with the first web resource, the virtual session manager will transmit a login credential with the first authorization request and receive a grant token from the endpoint device. If the request is to connect to an existing session with the first web resource, the user will transit a grant token for the session to the endpoint device. In either case, the user will not provide the first electronic device with any access to the grant token. The virtual session manager will receive, from the endpoint device, a first access token in response to the first authentication request. The first access token will: (i) have a life that is shorter than a life of the grant token such that the grant token is relatively long-lived and the first access token is relatively short-lived; and (ii) be configured to grant the first electronic device access to the web resource. The virtual session manager will transmit the first access token to the first electronic device so that the user agent can establish (i.e., start or connect to) a virtual session with the first web resource. Optionally, the virtual session manager may require confirmation that one or more additional rules are satisfied before it will transmit the first access token to the first electronic device.

Optionally, the virtual session manager of the second electronic device may identify one or more parameters associated with the user's use of the first web resource at a time when the grant token was previously transmitted to the endpoint device. When sending the first access token to the first electronic device, the virtual session manager also may send the one or more parameters so that the first electronic device can reconnect to the first web resource and establish the virtual session as a continuation of a previous virtual session.

Optionally, the virtual session manager of the second electronic device also may output identifiers for various virtual sessions for the first web resource, each of which has a corresponding grant token. The virtual session manager may receive a selection of one of the virtual sessions via a user interface of the second electronic device. It will then transmit, to the endpoint device with the first authentication request, a request to connect to the selected virtual session, and the grant token that is presented to the endpoint device will then be the grant token that corresponds to the selected virtual session.

Optionally, the virtual session manager also may: (i) provide the first electronic device with identifiers for multiple available virtual sessions for the first web resource; (ii) receive, from the first electronic device, a request to start a new virtual session rather than connect to any of the available virtual sessions; and (iii) identify the grant token as a new grant token for the new virtual session and store the new grant token in a memory of the second electronic device.

Optionally, in response to receiving a request to start a new virtual session, the virtual session manager also may generate a prompt for the user to present an access credential to the second electronic device. The virtual session manager may receive the access credential via a user interface and confirm that the access credential authorizes the user to access the first web resource. In response to receiving the access credential and confirming that the access credential authorizes the user to access the first web resource, the virtual session manager may transmit the request to start the new virtual session to the endpoint device with the first access request.

Optionally, when the first access token expires or is about to expire, the virtual session manager also may receive a re-authentication request, optionally from the first electronic device, via a user interface of the second electronic device, or automatically when the virtual session manager generates it in response to the expiration or pending expiration. The virtual session manager may present the re-authentication request with the grant token to the endpoint device without the first electronic device having any access to the grant token. The virtual session manager may receive an updated access token from the endpoint device. The updated access token will be configured to replace the first access token and enable the first electronic device to maintain the virtual session, and it will have a life that is shorter than the life of the grant token. The virtual session manager will transmit the second access token to the first electronic device.

Optionally, the virtual session manager may present the user an interface via which a user may command the virtual session manager to: (i) disable the virtual session; (ii)

re-enable a disabled virtual session; (iii) re-group a virtual session, in which case the virtual session manager will identify an alternate virtual session for which it has a grant token, send the grant token for the alternate virtual session to the endpoint device, receive an alternate access token from the endpoint device, and transmit the alternate access token to the first electronic device so that the first electronic device will replace the first access token with the alternate access token and its user agent may use the alternate access token to connect to the alternate virtual session; (iv) delete the virtual session, in which case the virtual session manager will delete the grant token for the virtual session; or (v) remove the first electronic device, in which case the virtual session manager will prevent the user agent from receiving additional access tokens until the virtual session manager receives a valid authentication credential that permits the user agent to re-connect to the virtual session manager.

In some embodiments, a web resource or user agent may require a user presence token in order to start or maintain a session between the user agent and the web resource. If so, virtual session manager may require the user to perform a user action, and it may determine whether the user action matches an expected action. If the virtual session manager detects that the user action matches the expected action, the virtual session manager may generate a user presence token. The virtual session manager may transmit the user presence token to the first electronic device with the access token so that the user agent can present the user presence token to the web resource with the access token.

In additional embodiments, a method of maintaining a web session for a user may include, by one or more endpoint devices, receiving a first authentication request. The first authentication request may include a request by a user agent of a first electronic device that is being used by a user to access a first web resource. The first authentication request may be received from a second electronic device rather than the first electronic device. The endpoint device(s) may determine that the second electronic device includes a virtual session manager to which the user is associated (such as by being logged in). If the request is to connect to an existing session, the request may include a grant token. The endpoint device(s) may confirm that the grant token is valid and then transmit a first access token to the second electronic device. The first access token will be configured to grant the first electronic device access to the first web resource. If the request is to start a new session, the endpoint device(s) may send a new grant token to the second electronic device.

Optionally, to determine that the virtual session manager includes the grant token, the endpoint device(s) may receive the grant token with the first authentication request.

Optionally, the endpoint device(s) may receive a re-authentication request and the grant token from the second electronic device and confirm whether the grant token is still valid. If the grant token is still valid, the endpoint device(s) will send an updated access token to the second electronic device. The updated access token will be configured to replace the first access token and enable the user agent to maintain access to the first web resource.

DETAILED DESCRIPTION

Figure 1:
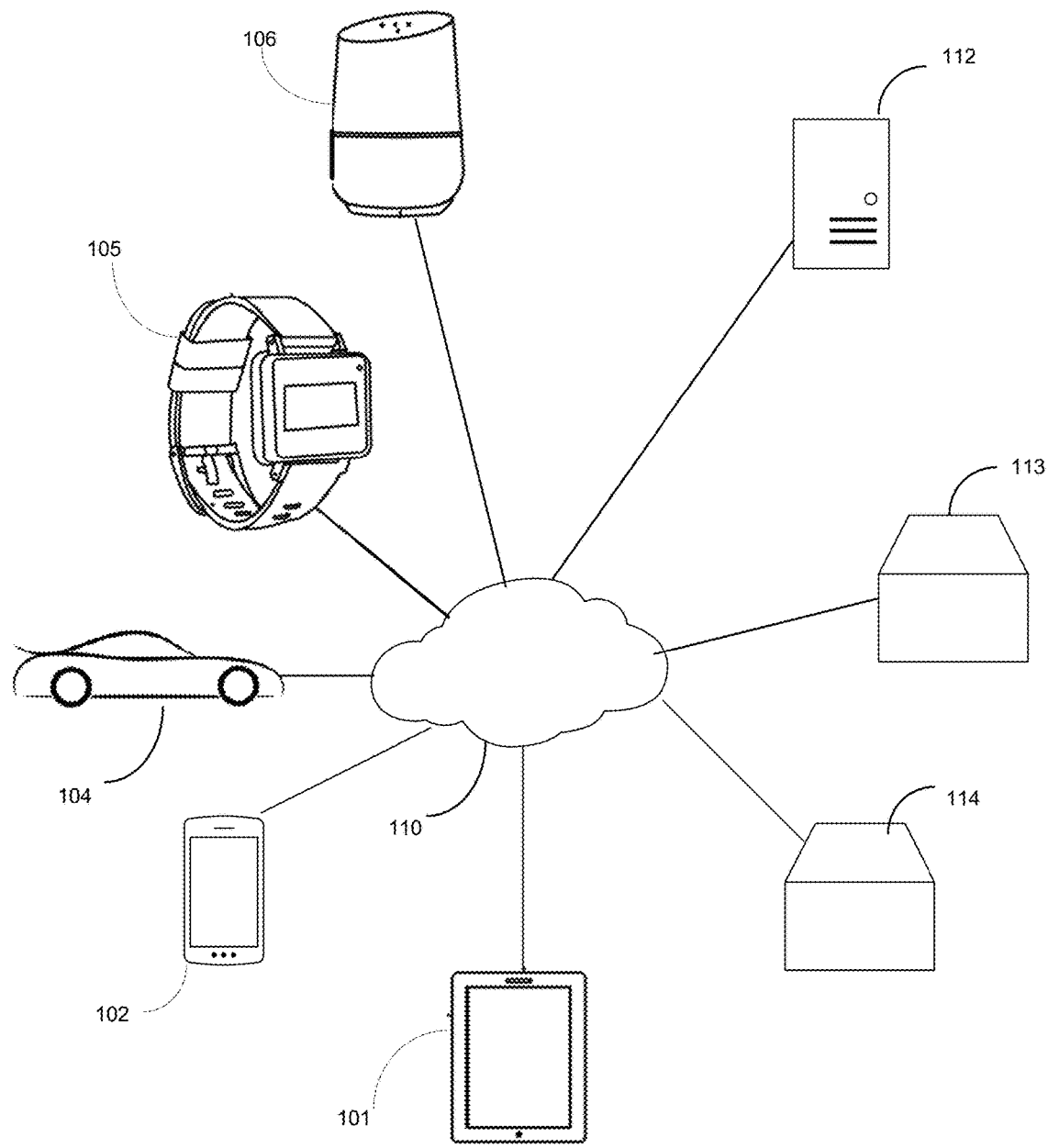
FIG. 1 illustrates an example of the various entities that make up a system including various hosted services, users, and devices.

Terminology that is relevant to this disclosure includes:

The singular forms "a," "an," and "the" include plural references unless the context clearly dictates otherwise. Also, the term "comprising" (or "comprise") means "including (or include), but not limited to." The relative terms "long" and "short" are intended to be relative measurements with respect to each other, in that the measurement value of an item that is designated as "long" will be relatively longer than the measurement value of a corresponding item that is designated as "short." Unless defined otherwise, all technical and scientific terms used in this document have the same meanings as commonly understood by one of ordinary skill in the art.

An "access token" is a short-lived token that represents a user's approval for a user agent to access a web server on behalf of a user. An authentication cookie is an example of an access token. A cookie is a small piece of data that is sent by a website and stored in the user's web browser while the user is using the browser to access one or more websites.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers (such as those used in hosted services), mainframes, virtual machines, containers, gaming systems, televisions, and mobile electronic devices such as smartphones, personal digital assistants, cameras, tablet computers, laptop computers, media players and the like. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity.

An "endpoint device" is a physical or virtual device or a group of physical or virtual devices that serve as an entry point for event-driven background processing for the grant of access to one or more web resources in a communication network. For brevity, this document may refer to an endpoint device simply as an "endpoint." Examples of endpoints discussed in this document include a login endpoint and a re-authentication endpoint.

A "grant token" is a long-lived authentication token that represents a user's approval for one or more user agents to access one or more web servers on behalf of the user. A grant token may be stateful (in which case the grant token has a record in a server-side data storage facility) or stateless (meaning that no server-side record exists for the grant token).

The term "hosted service" refers to a system that includes one or more electronic devices that will remotely provide or process data or execute programming applications for one or more client electronic devices. A hosted service may be provided in the form of software as a service, platform as a service, or infrastructure as a service. A hosted service may include servers and infrastructure elements (such as operating systems and communication systems) that are dedicated to each client, or it may provide services to multiple clients with shared servers and other resources. Examples of hosted services include web services, email services, other messaging services, cloud data storage services, multimedia content services, social media services and other types of hosted services. In some embodiments, a hosted service may make a group of such services available to a user with a common login and a single user account.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as sections within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices collectively perform a process.

A "user agent" refers to a software agent that is configured to act on behalf of a user of an electronic device to access a hosted service. Examples of user agents include browsers and native applications such as email or messaging clients, streaming media service applications, and cloud storage service applications.

A "virtual session manager" is a software application that is configured to run on an electronic device and manage the device's ability to access one or more remote web services via one or more web sessions.

A "web resource" is a remote service that is available from a hosted service in a communication network, such as a website, a cloud-based storage service, or a cloud-based electronic messaging service.

The terms "web session," "virtual session" and "session" synonymously refer to a sequence of request-response transactions to one or more web resources in a communication network that are initiated by a single user. Examples include HTTP request-response transactions in an HTTP session. The requests in a session will be spaced apart in time such that the time between requests does not trigger an inactivity threshold in which the user is required to log into the user's account again to continue accessing the web resource.

A "web token" is a token representing claims to be transferred between two entities.

FIG. 1 illustrates various components of systems and relationships between electronic devices that will be discussed in this document. Any number of hosted services 113, 114 are available to provide web resources to client electronic devices via a communication network 110. The communication network 110 may be a local area network (LAN), a wide area network (WAN), a mobile or cellular communication network, an extranet, an intranet, the Internet and/or combinations of any of these networks or other networks. Examples of client electronic devices include a smartphone 102, a computing device 103 such as the tablet computing device shown, on-board vehicle devices 104 such as in-dashboard entertainment and navigation systems, wearable electronic devices such as a smart watch 105, and connected Internet of Things devices such as a home voice assistant 106.

In certain embodiments, one or more endpoint devices 112 may be available to receive authentication requests from the electronic devices and issue authentication tokens to the electronic devices using procedures such as those discussed below.

Figure 2:
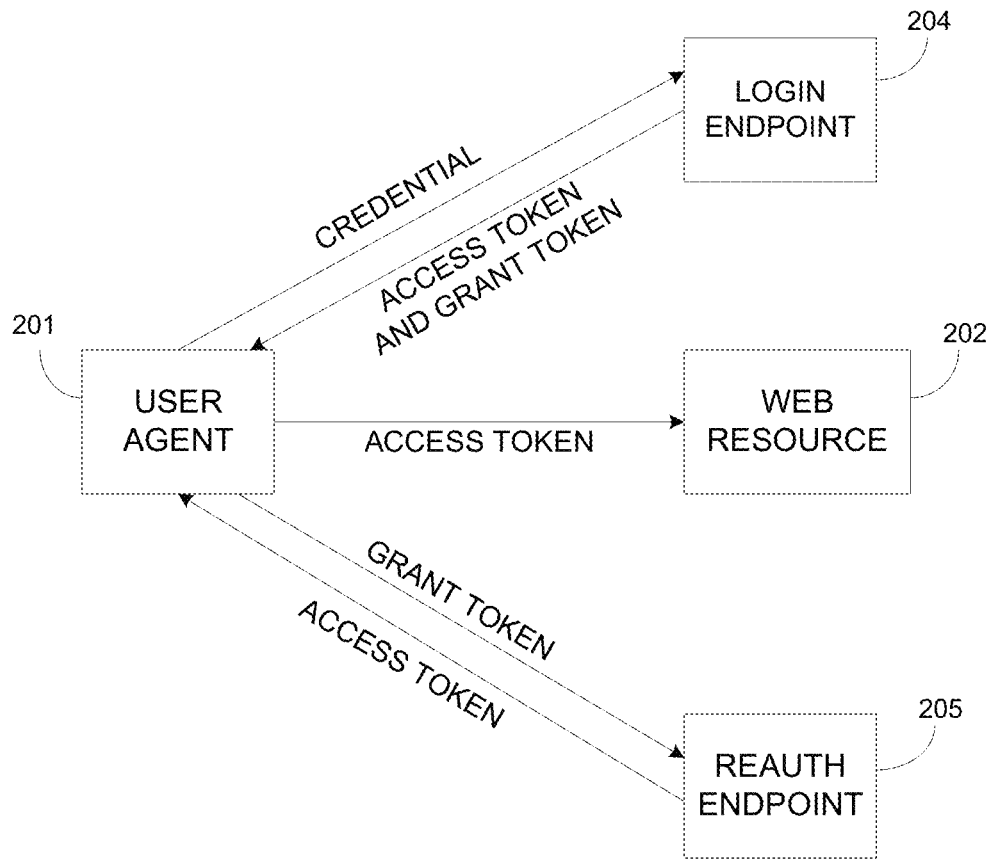
FIG. 2 illustrates an example of a two-token authentication model.

FIG. 2 provides a high-level overview of a method of authenticated session management using a two-token model. In the two-token model, two authentication tokens are used to manage a session between a user agent 201 of an electronic device and a web resource 202. When the user agent 201 issues an authentication request for the web resource 202, it will present a credential to a login endpoint 204. If the credential is valid (i.e., if it permits the user agent to access the web resource), the login endpoint 204 will establish the session by issuing an access token and a grant token to the user agent 201. The user agent 201 will store the access token and the grant token in a memory of its associated electronic device. The user agent 201 can then present the access token to the web resource 202 in order to be granted access the web resource 202.

When the access token is expired or about to expire, the user agent 201 can send a re-authentication request to a re-authentication endpoint 205. The re-authentication endpoint 205 may be separate from the login endpoint 204 as shown, or the two endpoint devices may share one or more hardware elements. Upon validating of the re-authentication request, the re-authentication endpoint 205 will return a new access token to the user agent 201 so that the user agent 201 can maintain the session with the web resource 202.

The grant token represents a user's approval. The grant token has a relatively long life, and optionally an infinite lifetime. A user agent can present a grant token to obtain new authentication tokens. The grant token keeps the user's approval in the user agent for a relatively long time, unless the user or another entity revokes or invalidates it. In this way, the user does not need to authenticate again and again during that lifetime of the grant token. A grant token may include a timestamp representing its time of creation. The grant token also may include an identifier that the system can use to identify the user who is associated with the grant token (i.e., the recipient of the grant token). In addition, the grant token may include fields such as an address of the re-authentication endpoint, an identifier (such as a session cookie name) for the access token, an expiration time, and/or an address from which an image of the user may be returned.

The access token has a relatively short life (i.e., a shorter life than that of the grant token). This shorter life can limit the ability of such tokens to be misused if compromised. The access token may be presented to a web resource to gain access to the web resource. The grant token may not be used for that purpose.

Figure 3:
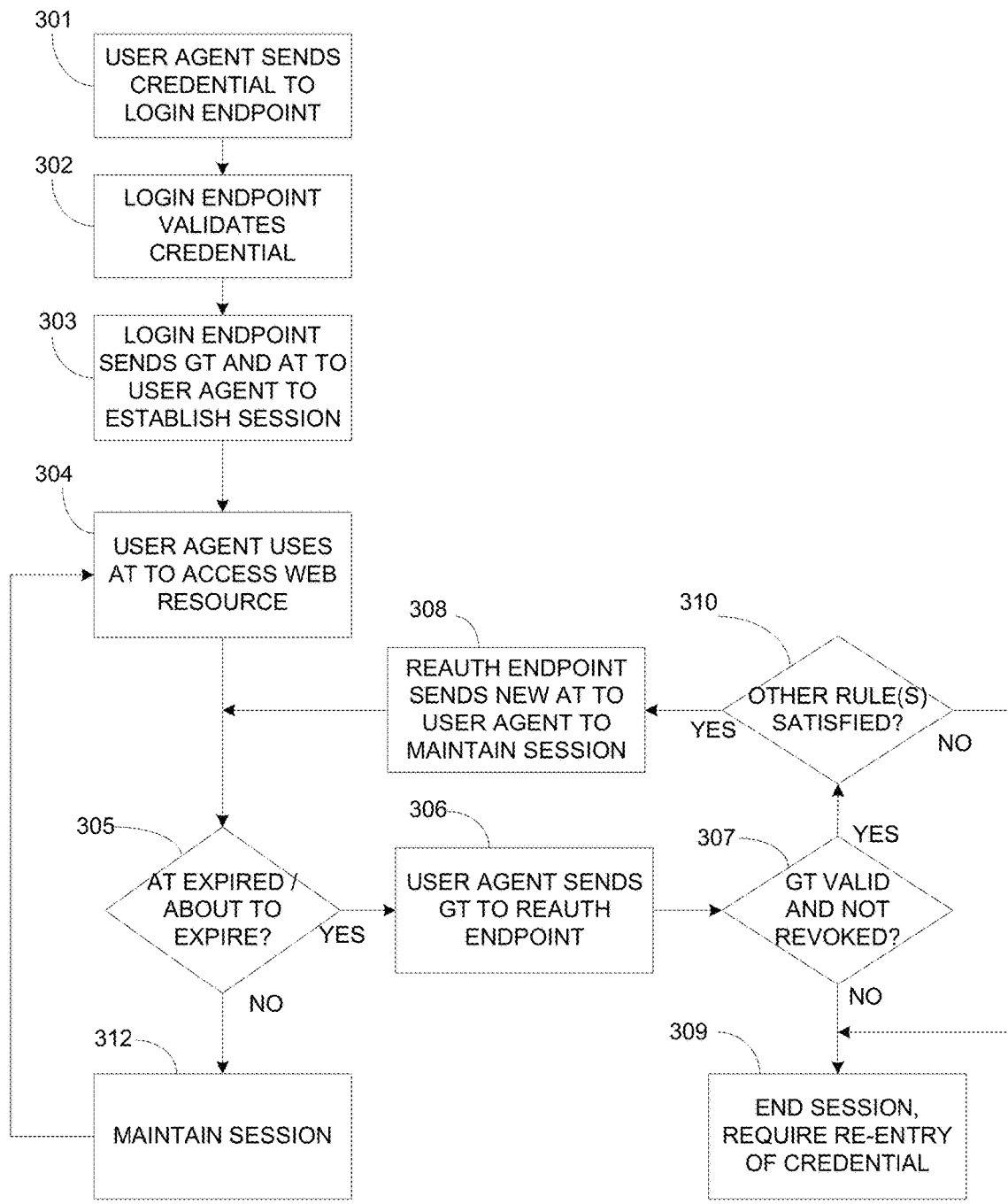
FIG. 3 is a flowchart that illustrates an example process of two-token authentication.

This process is further illustrated in the flow diagram of FIG. 3. In order to request access to a web resource, a user agent may transmit an authentication request to a login endpoint 301 by transmitting a credential to an address of the login endpoint. The credential can be any credential that the login endpoint can use validate the credential 302 and thus determine whether the user agent is authorized to access the web resource, such as a passphrase, a biometric identifier, a key or any other credential.

If the credential is valid (i.e., if it permits the user agent to access the web resource), the login endpoint will establish a session by transmitting an access token and a grant token to the user agent 303. In some embodiments, the login endpoint may establish the session as an authenticated HTTP session by returning an authentication cookie (whose value is the authentication token) in the set-cookie HTTP header. Other methods of issuing the tokens to the user agent may be employed. Optionally, when the login endpoint returns the grant token and access token to the user agent, the login endpoint also may transmit a uniform resource locator (URL) or other address of the re-authentication endpoint so that the user agent knows the address to which it must send a request for a new access token.

The user agent can then transmit the access token to the web resource 304. The web resource will give the user agent access to the web resource and thus maintain the session 312 so long as the access token is valid and has not expired.

When an access token has expired or is about to expire 305 (i.e., within a threshold period of time or other unit of measure from anticipated expiration), the user agent can send a re-authentication request 306 to the re-authentication endpoint to request a new access token. The re-authentication request may include the grant token, or it may include another token that is derived from the grant token. For example, instead of sending the actual grant token the user agent may send a hash-based message authentication code (HMAC) signed by the grant token to indicate that user agent owns the grant token. In some embodiments, the user agent may submit the re-authentication request as an XMLHttpRequest to the re-authentication endpoint, with the grant token in the "authorization" HTTP header.

Upon receipt of a re-authentication request from the user agent, the re-authentication endpoint will determine whether the grant token is valid and not revoked 307 using any suitable validation process such as a lookup table or access control list. If the grant token is valid and not revoked 307, the re-authentication endpoint may return a new access token to the user agent 308 so that the user agent can use the new access token to maintain the session. Otherwise, the re-authentication endpoint will not return a new access token, in which case the session will expire 309 when the original authentication token expires. For example, the re-authentication endpoint may return an error message in the HTTP response body. The user agent will then be required to present a credential again to the login endpoint or the re-authentication endpoint to maintain the session or establish a new session. Also, the user agent may then delete the grant token from its device's memory. The re-authentication endpoint may also send a "delete grant token" command to a logout endpoint or other server-side location where the grant token has been stored, optionally in association with the user's profile.

Optionally, as a condition returning a new access token, the re-authentication endpoint also may require that the user's profile data satisfies one or more additional rules 310. For example, the re-authentication endpoint may access a data storage facility with a profile for the user that is associated with the grant token, examine the data in the user's profile, and only return the access token if: (i) the user has not changed its credential since a most recent prior access request; and/or (ii) no known account associated with the user has been flagged as having encountered suspicious activity that may indicate that the account has been compromised. In this way, the re-authentication endpoint will ensure that the grant token is not issued if one or more significant events associated with the user's account have occurred, such as a login credential change or a potential security compromise. Other rules may require different conditions.

The system also may provide for the entry of logout commands, which will expire or revoke grant tokens. For example, a user interface of the first electronic device may permit the user to enter a command to terminate the session, in which case a command to revoke of the grant token will be sent to the re-authentication endpoint and/or a server that contains the user's profile. The user's electronic device also may delete the grant token in response to the command. The electronic device also may transmit a command to the re-authentication device and/or a logout endpoint to delete the grant token.

Figure 4:
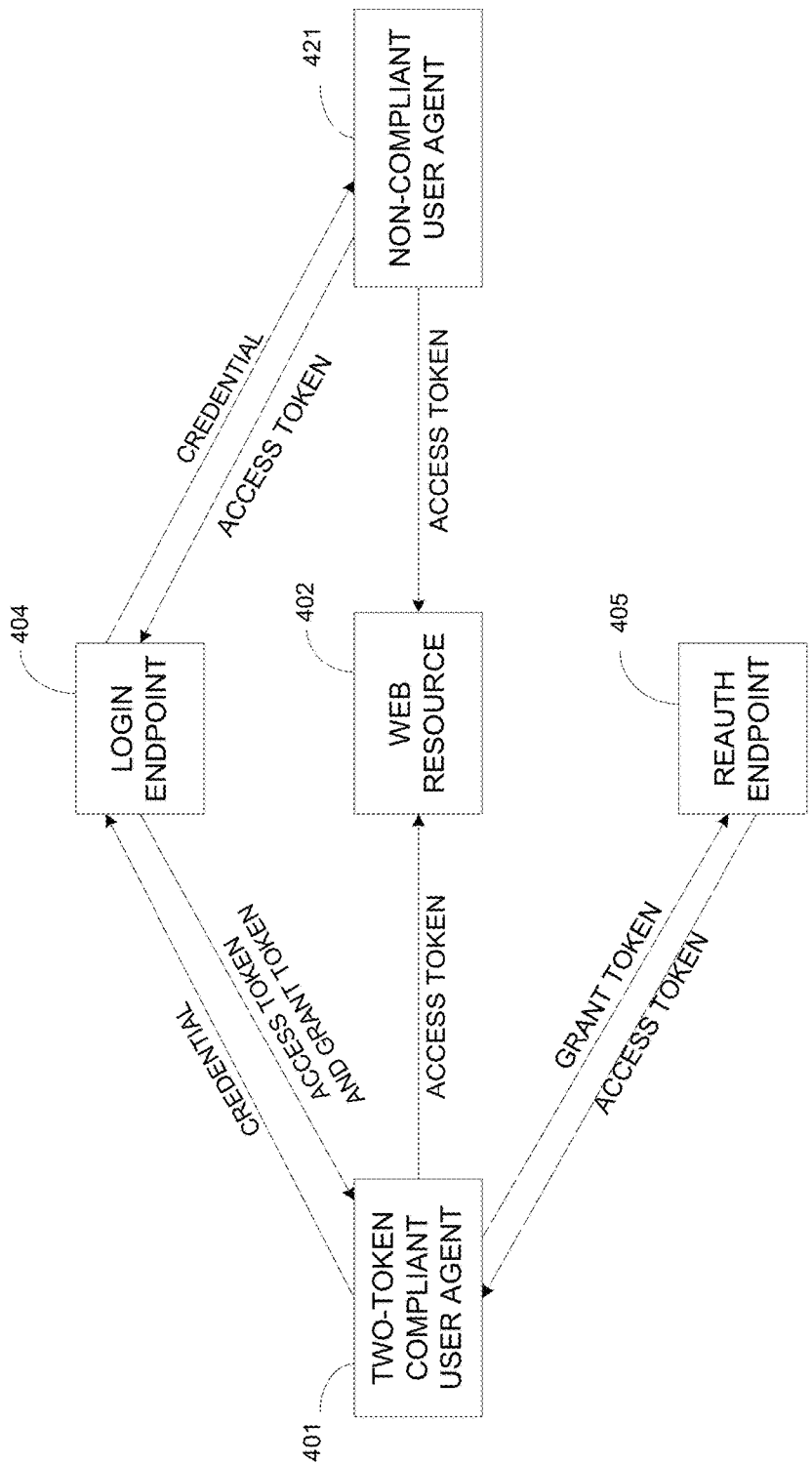
FIG. 4 illustrates how a system may implement a two-token model with a variety of user agents, some of which may not support the two-token model.

In various embodiments, the two-token model described above may use an access token format that matches that of a cookie in a single token model. In this way, if a particular user agent does not support a two-token model, the login endpoint may return only an access token to that user agent, or the user agent may receive a grant token but ignore it. FIG. 4 illustrates how a two-token model may be used with both two-token complaint user agents and user agents that do not have two-token model support capability. In FIG. 4, a web resource 402 may be available to various types of user agents, including a first user agent 401 that is programmed to support a two-token model and a second user agent 421 that does not have such programming and cannot support a two-token model. Each of the user agents 401, 421 can request access to the web resource by presenting their credentials to the login endpoint 404. When the login endpoint 404 receives an authentication request from a user agent, the login endpoint 404 will examine the authentication request to determine whether the user agent supports the two-token model. One way of doing this may be that a two-token model compliant user agent will self-identify that it is two-token model compliant in a header of the authentication request (such as an "Accept-Session-Management" HTTP header). If the login endpoint 404 determines that the user agent is two-token compliant, it will return both an access token and a grant token to that user agent 401. When the access token expires or is about to expire, the two-token compliant user agent 401 may then use the grant token to submit a re-authentication request to a re-authentication endpoint 405. If the login endpoint 404 determines that the user agent is not two-token compliant, it will return only an access token, but a not grant token, to that user agent 421. Each of the user agents 401, 421 may use their access tokens to access the web resource 402.

Grant tokens can be stored on the server side and enable a user agent to have multiple sessions active at any point in time. To enable this, any of the endpoints may create and store a session record for each grant token. The session record will include the grant token and information that can be used to distinguish that grant token's session from other sessions that are associated with the user agent, such as an identifier for the user account, a user agent identifier, time of creation, time of last access, and/or other data. The system also may generate and store data (such as web tokens) with additional data such as the address of the re-authentication endpoint, the name of the access token, an expiration time for the access token, a timestamp when the grant token was issued, an expiration time for the grant token, an email or other address for the user, a name or other identifier to display for the user, and/or an address from which the system may retrieve a digital image file that is associated with the user (such as user image).

When a user logs out of a particular session, the endpoint will delete the session record from its memory. A session record also may be deleted in response to an action by an administrator, or if one or more session termination rules have been identified. For example, the endpoint may automatically terminate a session if one or more security-related issues have been identified with the user's account. Examples of such issues include: (i) the occurrence of a credential change; (ii) or a per-user active session limit having been reached (i.e., that the user is logged into more than a threshold number of sessions at one time; or (iii) detection that multiple user agents associated with a single user are being used in disparate locations at the same time or within a time frame in which the user could not have been in all of the locations during the time frame.

In addition, the device endpoint(s) can provide a session manager user interface that displays all active grant tokens for a current user across a set of user agents. For example, a user (e.g., user1@example.com) who is logged into a website can visit the session manager web page, and view all grant tokens issued by the website in the name of user1@example.com. The session manager also may display additional information for each grant token such as device information, login time, or other details to help the user distinguish the grant tokens from each other. By browsing the session manager, the user may be alerted that he or she neglected to log out of a session on a particular device. Or, the user may be alerted that his or her account is being used on an unrecognized device. In either case, the session manager may enable the user to terminate a session by providing a user interface that will receive a termination command, in response to which the system will delete the grant token corresponding to that session.

Figure 5:
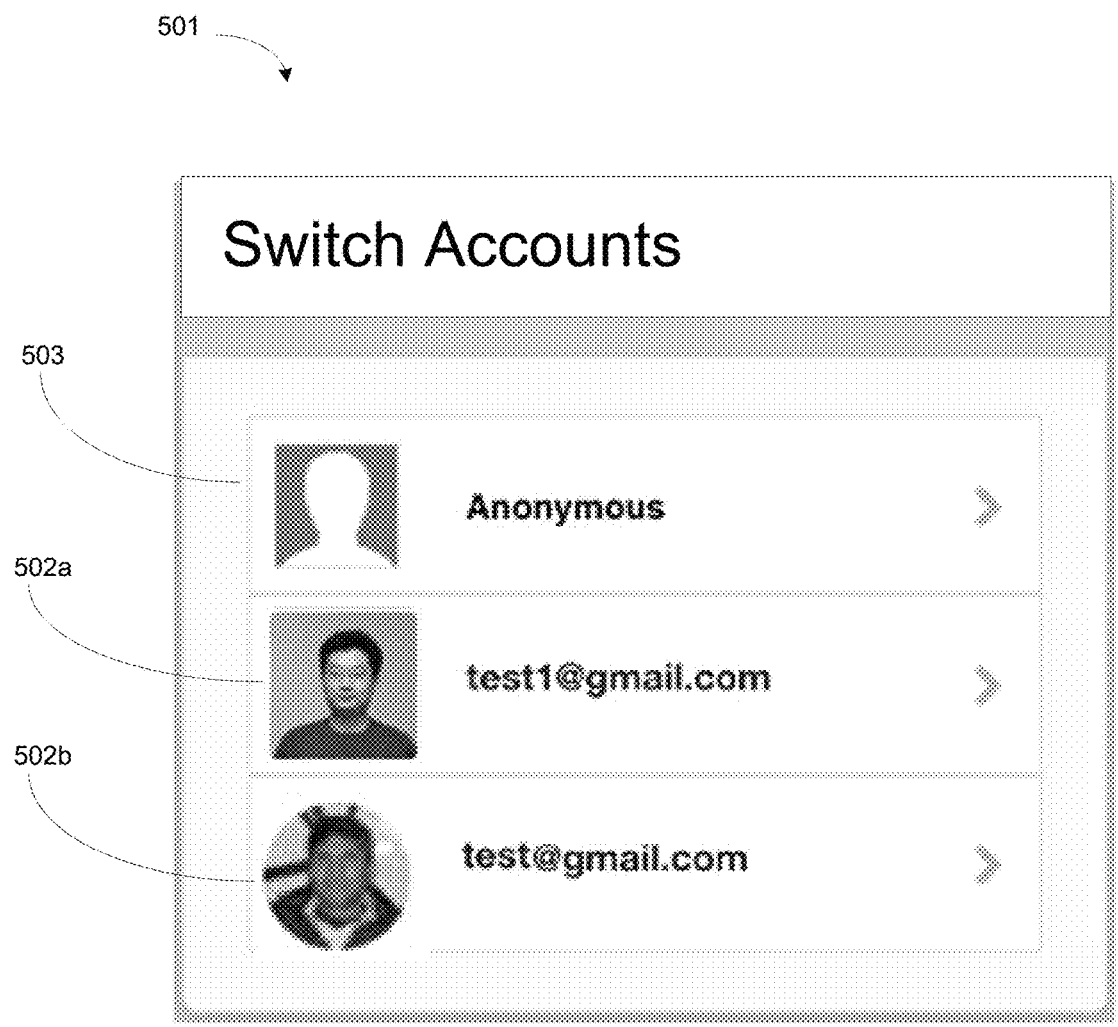
FIG. 5 illustrates an example account manager user interface.

The user agent or device also may generate an account manager user interface that identifies accounts that are associated with the user agent, and that enables the user to select the connect to, or log out of, any of various accounts to create a new session or join an active session for each account. In some embodiments, each user account will be associated with a single grant token and a single session, although other configurations may be possible. FIG. 5 illustrates an account manager user interface 501, in which the user can select one of multiple accounts 502a, 502b that are associated with the user agent. Upon selection of an account, the session manager will identify or obtain the grant token for that account, and it will provide the user agent with the access token for the appropriate account. As shown, the account manager interface also displays various information about each account, such as an email address or user image for the user for the session. (As noted above, the grant token may include an address from which a user image may be returned.)

Optionally, one of the accounts available on the account manager user interface may be an anonymous account 503, in which case the system may not generate a grant token at all. With an anonymous account, the user may be given limited permissions to take certain actions (such as view posts on a website, but not create or reply to those posts).

The two-token model can help manage multiple accounts with a single user agent. Without a two-token model, to switch accounts the user would need to actively log out of a first account, and then log into a second account by entering his or her credentials for the second account. However, if the user agent stores grant tokens for each of various accounts, the user may not be required to log in when switching to a second account. Instead, when the account manager user interface receives a request to switch from a first account to a second account, the user agent can simply retrieve the grant token for the second account and use the grant token to obtain an access token for the web resource.

The two-token model also may be used to facilitate a single session across multiple web resources. For example, a user and/or a hosted service may provide a document generation service (such as a word processor) and a cloud file storage service as a common web resource, and thus may desire to treat the user's use of such services as a single session. If so, then the user's electronic device, or a different electronic device that the user is using, may include a second user agent. The second user agent may generate a second authentication request 602 to access the first web resource. The second user agent will receive access to the grant token 601, either by the first user agent or by an endpoint that contains the grant token. The second user agent will transmit 603 the second authentication request with its credential and the grant token to a re-authentication endpoint. The re-authentication endpoint will return 604, and the second user agent will receive, an access token in response to the second authentication request. The second user agent may use the received access token to access the web resource 605 and maintain the web session 612 until the access token expires. When the access token expires or is about to expire 606, the second user agent may access the re-authentication endpoint and request a new access token 607 using procedures such as those discussed above in the context of FIG. 3.

As another example of how the two-token model can facilitate a single session across multiple web resources, a service provider may offer web resources in different top-level domains (TLDs) for various reasons, such as: (1) offering web resources that are customized for particular countries (and thus that use the TLDs for those countries); (2) to use various different brands (with the relevant brand name in the TLD); (3) when transitioning from one TLD to another TLD (as in the case of a corporate acquisition); and/or (4) for other purposes. The session cookie for one of these web properties may be invisible to the others, since they are in different TLDs, and because they may involve separate (and sometimes incompatible) session management systems. The two-token model may be used facilitate the integration of these web resources by issuing a common grant token that is acceptable to each of the re-authentication endpoints on the various TLDs.

Figure 6:
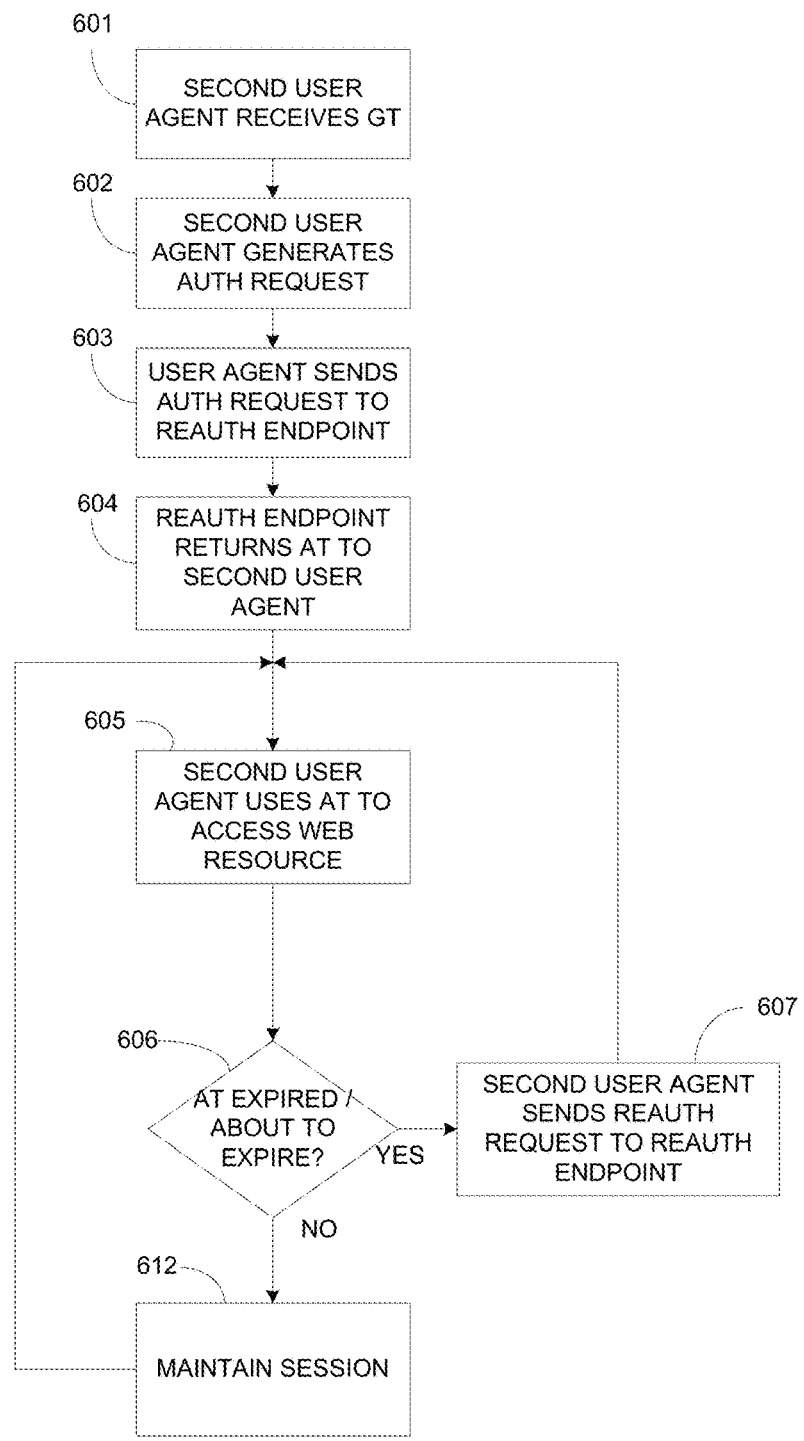
FIG. 6 is a flowchart that illustrates an example process of two-token validation with multiple user agents.

Similarly, a user and/or a hosted service may provide a document generation service (such as a word processor) and a cloud file storage service as separate web resources, but still may desire to treat the user's use of such services as a single session. If so, then the first user agent may generate a second authentication request that comprises a request to access a second web resource. The first user agent may transmit the second authentication request with the grant token to the login endpoint and receive an additional access token in response to the second authentication request. The first login endpoint may use the new access token to access the second web resource and maintain the web session. In addition, this process may be used with a second user agent, in which the process of FIG. 6 will apply, but with an access token for the second web resource instead of the first web resource.

In some embodiments, to maintain a session across multiple devices, a user agent of the user's first electronic device may not hold a grant token, but instead the grant token may be held by a second electronic device that is in a communication range of the first electronic device. The second electronic device will include a virtual session manager that manages the session across multiple electronic devices. Only client devices with a virtual session manager will hold the grant token; other client devices will not be given the grant token. In this way, dissemination of the grant token is limited to certain client devices that are have virtual session manager functionality. This will be described in more detail below.

The two-token model can provide several technical advantages, including better security by decreasing the time window in which access tokens must remain valid (and thus can be leaked), a better user experience by requiring the user to re-enter credentials less frequently, a standard method of terminating sessions when account security issues are detected, and operation in a multiple-device environment.

The multiple device environment is now described with reference back to FIG. 1, in which any number of client electronic devices can serve as human interface devices (HIDs) in a multiple-HID environment. Examples of client electronic devices shown include a smartphone 102, a tablet computing device 103, an on-board vehicle device 104, wearable electronic devices such as a smart watch 105, and a home voice assistant 106 or other smart home device. One or more endpoint devices 112 may be available to receive authentication requests from the client electronic devices and issue authentication tokens to the electronic devices to establish and maintain sessions across any number of hosted services 113, 114 via a communication network 110.

Figure 7:
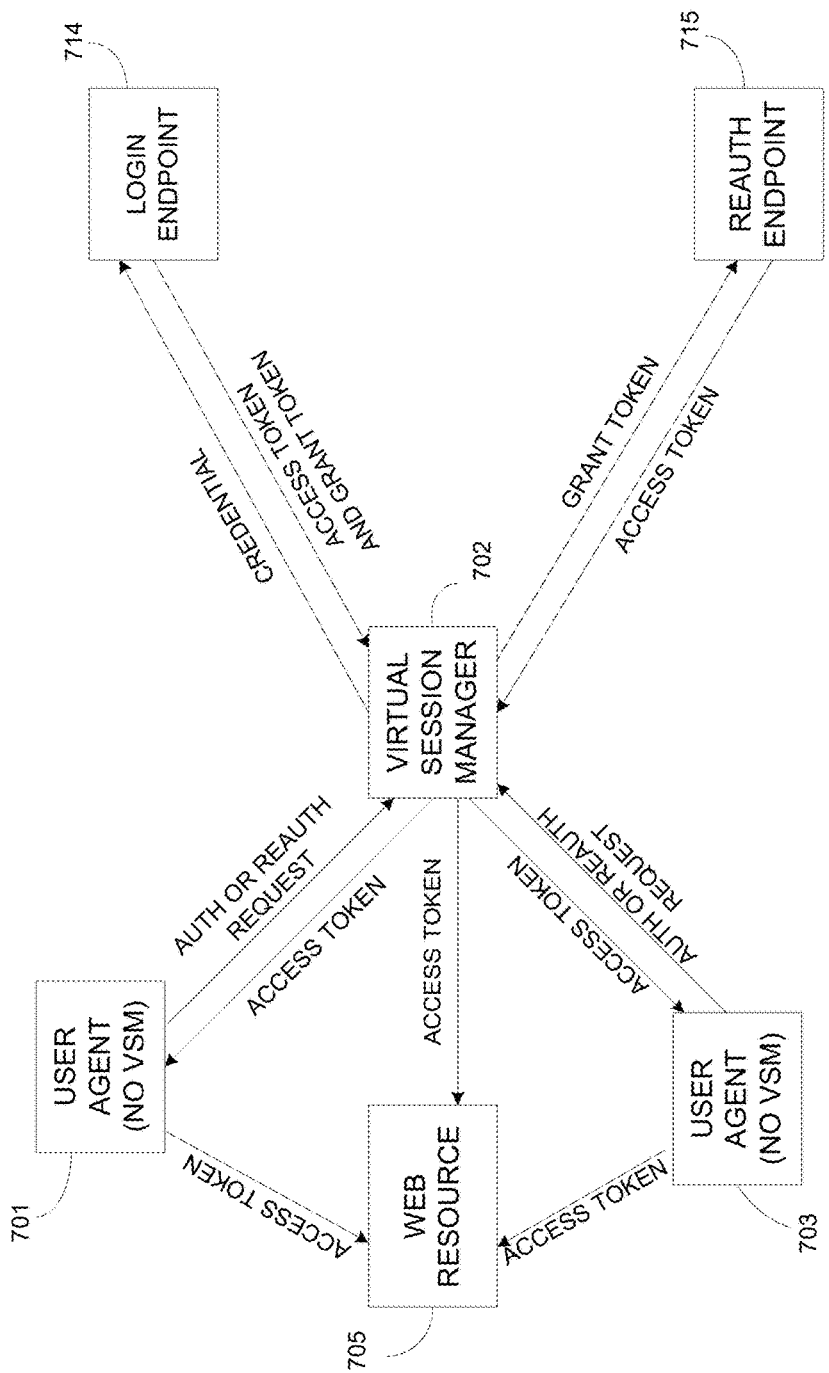
FIG. 7 illustrates how a virtual session manager may manage authentication of multiple devices and allow the devices to share a single session.

In this embodiment, at least one—but not all—of the client electronic devices will include a virtual session manager. A virtual session manager is an application that stores a grant token for a session and facilitates access to the session by other client electronic devices that are not given access to the grant token. FIG. 7 illustrates how the virtual session manager may be implemented. A first client electronic device 701 that does not include a virtual session manager may discover that a second client electronic device 702 with a virtual session manager is in a communication range of the first client electronic device 701. The communication and transmissions between the devices may use any suitable communication protocol, such as Bluetooth, radio frequency identification, Wi-Fi, another short-range or near-field communication protocol, or the like. Any suitable discovery technique may be used, such as Bluetooth service delivery platform (SDP), Universal Plug and Play (UPnP), simple service discovery protocol (SSDP), or operating system-level services. If the first electronic device 701 discovers one or more devices with a virtual session manager, the user agent of the first electronic device 701 may cause a user interface to output identifiers associated with each discovered device so that the user can select the virtual session manager to which the first electronic device 701 will connect.

A virtual session manager of the second electronic device 702 may establish a web session with the web resource 705 using a process such as that described above in the context of FIGS. 2 and 3. In particular, when a virtual session manager of the second electronic device 702 wishes to establish a session with a web resource 705, it will send an authentication request to the login endpoint 714. The authentication request is a request to access the web resource 705 and will include a login credential for the user of the second electronic device 702. If the credential is valid, the login endpoint 714 will return a grant token and an access token to the virtual session manager. The virtual session manager of the second electronic device will store the grant token in the second electronic device 702. If the virtual session manager is also a user agent or if the second electronic device also includes a user agent, the second electronic device also may use the access token to access the web resource 705. When the access token has expired or is about to expire, the virtual session manager of the second electronic device 702 may send a re-authentication request to a re-authentication endpoint 715. The virtual session manager may receive the re-authentication request from the first electronic device, via a user interface of the second electronic device, or automatically when the virtual session manager generates it because it detects the expiration or pending expiration. The re-authentication endpoint 715 will review the request and return a new access token to the second electronic device 702 using methods such as those previously described. Any or all of the features of the grant token, access token, authentication request and re-authentication request that were described above in previous embodiments also may apply in this embodiment.

After any of the client devices without a virtual session manager discovers and establishes a communication link with the second electronic device 702, its user agent may send an authentication request to the second electronic device. For example, a user agent of the first electronic device 701 may send an authentication request to access to the web resource by sending the request to the second electronic device. The authentication request may be a request to start a new session with the web resource 705, or it may be a request to join the session that the second electronic device 702 has already established with the web resource 702. If the request is for a new session, the virtual session manager of the second electronic device 702 will send the authentication request with a login credential to the login endpoint 714, and it will receive a grant token and access token from the login endpoint 714. If the request is to join an existing session that the user agent of the first electronic device 701 had not previously joined, or if the request is to maintain an existing session that the user agent of the first electronic device 701 previously joined but for which the user agent's credential expired or is about to expire, the virtual session manager will send the grant token for that session to the re-authentication endpoint 715 and obtain a new access token for the user agent from the re-authentication endpoint 715.

In any of these situations, after receiving the access token from the relevant endpoint, the virtual session manager will send the access token to the first electronic device 701. The user agent of the first electronic device 701 can then save the access token and present it to the web resource 705. The second electronic device 702 will retain the grant token for the session and will not share it with the first electronic device 701.

A third electronic device 703 may also join the session with the web resource 705 using procedures matching those described above. In particular, the third electronic device 703 will send an authentication request for the session to the second electronic device 702. The virtual session manager of the second electronic device 702 will then send the grant token for the session to the re-authentication endpoint 715 to obtain an access token that the user agent of the third electronic device 703 can use to access the web resource 705 and join the session. As with the second electronic device 702, the third electronic device 703 will also not receive the grant token.

In any of these situations, when it receives an authentication request, the virtual session manager may discover that it is managing multiple sessions for the first web resource. If so, then the virtual session manager may cause a user interface of its electronic device to output the identifiers for each of the virtual sessions to that the user can choose one of the virtual sessions to join, as discussed above and shown in FIG. 5. When the user selects one of the sessions, the virtual session manager will send the authentication request to the applicable endpoint device with the appropriate grant token that applies to the selected session. Alternatively, the user may decline to join an existing session but instead may wish to start a new session. If so, the virtual session manager may obtain a new grant token for the new session and store the new grant token in its memory without sharing the new grant token with the first electronic device. If the user chooses a new session, the virtual session manager may require the user to enter a credential into the second electronic device before it will permit the user to start a new session, and the virtual session manager may only transmit the new session request to the endpoint if it confirms that the credential authorizes the user to access the web resource (using credential verification procedures such as those described above).

The virtual session manager may store a history that includes one or more parameters associated with the user's previous use of the web resource. These parameters can include last page visited on a website, a timestamp in a video or audio stream at which a user was last presented a streaming media file, or other parameters. The parameters may be those that existed when the virtual session manager last requested an access token for any of the devices' user agents. When sending an access token to a client device, the virtual session manager may also send any of these parameters to the client device so that the user agent of that client device can maintain or reconnect to a virtual session in an uninterrupted manner without having to re-enter the parameters.

The virtual session manager may enable a smooth transition between human interface devices in a single session. In addition, multiple devices can share and participate in the same web session. An untrusted device also may be given short-term access to a session by receiving a short-lived access token, but not be given any access to a long-lived grant token.

The virtual session manager also may cause the second electronic device to output a user interface by which the user may manage various aspects of a session. For example, the virtual session manager may enable a user to command the virtual session manager to do any or all of the following:

(i) disable the virtual session, in which case the virtual session manager will no longer obtain new or updated access tokens for that session so that future re-authentication requests for that session will not be granted, and optionally also sending the applicable endpoint device(s) a request to revoke the first access token, and optionally retaining the session's grant token for some period of time in case a user requests the virtual session manager to re-able the session;

(ii) re-enable a disabled virtual session, in which case the virtual session manager will resume requesting and granting new and updated access tokens for the previously disabled virtual session;

(iii) re-group a virtual session, in which case the virtual session manager will identify an alternate virtual session for which it has a grant token, send the grant token for the alternate virtual session to the endpoint device, receive an alternate access token from the endpoint device, and transmit the alternate access token to the first electronic device so that the first electronic device will replace the first access token with the alternate access token and use the alternate access token to connect to the alternate virtual session;

(iv) delete the virtual session, in which case the virtual session manager will delete the grant token for the virtual session; or (v) remove the first electronic device, in which case the virtual session manager will disable the first access token and prevent the first electronic devices' user agent from receiving additional access tokens until the virtual session manager receives a valid authentication credential.

The virtual session manager also may create and store a device record for each user agent that uses the virtual session manager to join a session. The device record may include an identifier for the user agent and/or its device, session parameters for that user agent (as described above), a timestamp for when the user agent joined the session, and/or other data. In addition, the virtual session manager may cause the client device on which it runs to output a user interface by which a user may edit one or more attributes of each connected user agent, such as by giving each user agent an alias, designating the user agent as trusted or untrusted, or other attributes.

With any of the embodiments described above, the virtual session manager can create or serve as a virtual identity wallet and/or password manager for a user. The user can use the virtual session manager to extend his or her identity to multiple devices on a short-term basis without having to enter passwords on each device, and manage each device's ability to use a session, while only granting long-term access capability to a single trusted device (or a select group of trusted devices). This can give an end user more efficient control over the access privileges that he or she wishes to grant to multiple devices in a connected environment.

In some embodiments, the virtual session manager may expire a particular user agent's access token if the user agent experiences an action that is outside of a scope of a trusted environment. For example, if the virtual session manager cannot detect the presence of the user agent's device using discovery protocols such as those described above, this may mean that the device has exited a trusted environment such as a known home or office. If so, the virtual session manager may expire the user agent's access token until it can re-discover the user agent's device. On the other hand, when a user agent's device enters a known trusted environment, such as a home or office, it may automatically connect to the virtual session manager and join a session. The devices may know that they are in a trusted environment based on finding known GPS location data, a known Wi-Fi network identifier, or other suitable parameters.

In some embodiments, systems that employ virtual session managers may use stateful grant tokens, meaning that there will be a server-side record of each grant token issued.

In some embodiments, in the two-token model and/or virtual session manger environments, a web resource, user agent and/or virtual session manager may require proof demonstrating that a user is actually present as a condition of granting the user agent access to the web resource and/or maintaining such access after a threshold period of time (such as a time of inactivity). If so, then the user agent may require a user presence token before it will send an access request to the web resource, or the web resource may require a user presence token before it will grant access, or the virtual session manager may require verification of user presence before it will issue an access token to the user agent. If so, then the user agent and/or virtual session manager may require some additional user action to provide second-factor authentication that will serve to confirm the user's actual presence. The additional user action may be, for example, speaking a passphrase, entering a personal identification number, applying a predetermined gesture sequence to a touchscreen, or doing any other action that can be verified by the user agent or the virtual session manager.

The system may require the user action to be performed on the first electronic device, on the device that includes the virtual session manager, or on a different device. For example, after a user presence token has expired the virtual session manager may require the user to activate an "approve" button on a user interface of its electronic device. In addition to the user presence action, the system may require that the device with the user agent and the device that has the virtual session manager be able to detect each other's presence within a communication range, such as by a near-field communication protocol.

If the user agent or virtual session manager can confirm the user action matches an expected action, and optionally of the devices can detect each other's presence, it will issue a user presence token. The user presence token will be relatively short-lived in that it will have a life that is no longer than that of the applicable access token. Or, it may have a life that is based not on time but based on number of uses, such as a single use. The user agent may include the user presence token when it transmits the access token to the web resource.

The virtual session manager also may impose one or more rules on a session based on one or more detected parameters. For example, the virtual session manager may impose a rule requiring that its device's user interface output a prompt for the user to approve any request from another device to connect to a session. The virtual session manager may then only obtain and forward an access token if and after the user provides such confirmation. This rule may apply to all authentication and re-authentication requests from any device. Alternatively, to improve user experience, the virtual session manager may apply the user approval only the first time that a device connects, only once during a threshold period of time, or not at all, so long as one or more additional rules apply, such as:

if the request is from a trusted device and the target web resource is categorized (in a data set that is accessible to the virtual session manager) as a web resource that is a low security resource (such as a public news website that typically requires no user credentials), then the virtual session manager may approve the request with no user interaction required on the virtual session manager's device;

if the request is to access a web resource that is categorized as a high security resource (such as a financial institution account website) then the virtual session manager may require user confirmation of approval with each request, or with each new request after a threshold period of time has passed;

if the request is to access a web resource that is a mail server, then the virtual session manager may select a virtual session associated with the user's work mail account if the second electronic device (or another detected proximate device) is known to be a work computing device, otherwise the virtual session manager may connect the user agent to a virtual session for the user's personal email account;

if the request is to access a web resource that is only to be accessed by the user during certain time frame (such as normal hours of employment), then the virtual session manager may obtain and forward the access token only if the current time is within that time frame.

The virtual session manager also may include a settings feature that enables a user to define rules such as those listed above and/or other rules.

Figure 8:
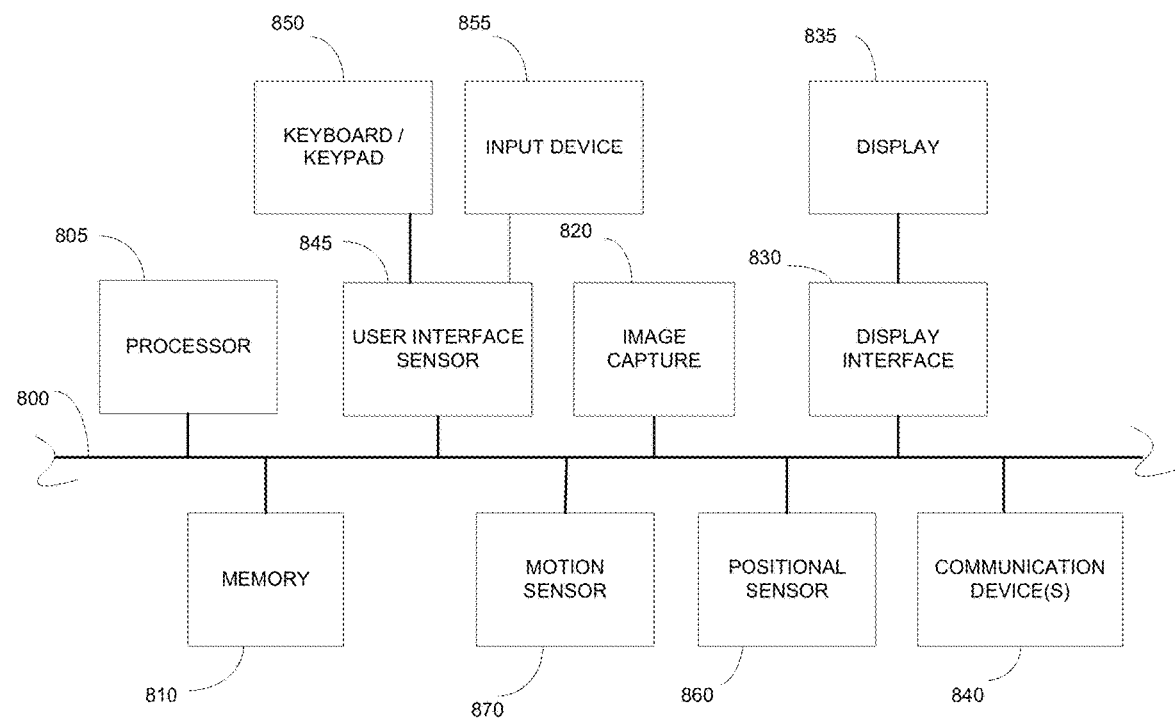
FIG. 8 is a block diagram showing example hardware components that may be included in various devices of the system, such as in a user electronic device, a hosted service or an endpoint device.

FIG. 8 depicts a block diagram of hardware that may be used to contain or implement program instructions, such as those of a hosted service, a monitoring service for a hosted service, an electronic device that is accessing a hosted service, or a virtual machine or container that serves in any of these roles. A bus 800 serves as an information highway interconnecting the other illustrated components of the hardware. The bus may be a physical connection between elements of the system, or a wired or wireless communication system via which various elements of the system share data. Processor 805 is a processing device of the system performing calculations and logic operations required to execute a program. Processor 805, alone or in conjunction with one or more of the other elements disclosed in FIG. 8, is an example of a processing device, computing device or processor as such terms are used within this disclosure. The processing device may be a physical processing device, a virtual device contained within another processing device, or a container included within a processing device.

A memory device 810 is a hardware element or segment of a hardware element on which programming instructions, data, or both may be stored. Read only memory (ROM) and random access memory (RAM) constitute examples of memory devices, along with cloud storage services.

An optional display interface 830 may permit information to be displayed on the display 835 in audio, visual, graphic or alphanumeric format. Communication with external devices may occur using various communication devices 840, such as a communication port or antenna. A communication device 840 may be communicatively connected to a communication network, such as the Internet or an intranet.

The hardware may also include a user input interface 845 which allows for receipt of data from input devices such as a keyboard or keypad 850, or other input device 855 such as a mouse, a touchpad, a touch screen, a remote control, a pointing device, a video input device and/or a microphone. Data also may be received from an image capturing device 820 such as a digital camera or video camera. A positional sensor 860 and/or motion sensor 870 may be included to detect position and movement of the device. Examples of motion sensors 870 include gyroscopes or accelerometers. Examples of positional sensors 860 such as a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of maintaining a web session for a user across multiple electronic devices, the method comprising:

by a user agent of a first electronic device that is being used by a user:

discovering a plurality of electronic devices including a second electronic device that is in a communication range of the first electronic device;

presenting, to the user, identifiers associated with each of the discovered plurality of electronic devices, including an identifier for the second electronic device;

determining that the second electronic device includes a virtual session manager;

receiving a first authentication request, wherein the first authentication request comprises a request to access a first web resource for the user at the first web resource;

transmitting the first authentication request to an endpoint device via the virtual session manager of the second electronic device so that the virtual session manager can present a grant token to the endpoint device or receive the grant token from the endpoint device without the first electronic device having any access to the grant token;

receiving, from the virtual session manager, a first access token in response to the first authentication request, wherein the first access token has a life that is shorter than a life of the grant token such that the grant token is relatively long-lived and the first access token is relatively short-lived;

storing the first access token in a memory; and using the first access token to access the first web resource and establish or maintain a virtual session with the first web resource, wherein one or more parameters associated with the user's use of the first web resource are automatically sent to maintain or automatically reconnect to the virtual session so that the virtual session is uninterrupted without manually entering the parameters.

2. The method of claim 1 further comprising, by the user agent of the first electronic device:

when receiving the first access token from the virtual session manager, also receiving a history from the virtual session manager, wherein the history includes the one or more parameters, the one or more parameters being associated with the user's use of the first web resource when the grant token was transmitted to the endpoint device.

3. The method of claim 1 further comprising, by the user agent of the first electronic device:

determining that the plurality of discovered electronic devices each include a virtual session manager; and receiving, via a user interface, a selection of the second electronic device.

4. The method of claim 1 further comprising, by the virtual session manager of the second electronic device:

upon receiving the first authentication request, determining that a plurality of existing virtual sessions are available for the first web resource, each of which has a corresponding grant token;

outputting identifiers for the virtual sessions;

receiving, via a user interface, a selection of one of a plurality of existing virtual sessions; and transmitting, to the endpoint device with the first authentication request, a request to connect to the selected existing virtual session;

wherein the grant token that will be presented to the endpoint device is the grant token that corresponds to the selected existing virtual session.

5. The method of claim 1 further comprising, by the virtual session manager of the second electronic device:

upon receiving the first authentication request, determining that a plurality of existing virtual sessions are available for the first web resource, each of which has a corresponding grant token;

outputting identifiers for the existing virtual sessions;

receiving, via a user interface, a request to start a new virtual session rather than connect to any of the existing virtual sessions;

when transmitting, the first authentication request to an endpoint device, transmitting the first authentication request to a login endpoint;

receiving the grant token from the login endpoint; and storing the grant token in a memory of the second electronic device.

6. The method of claim 5 further comprising, by the virtual session manager of the second electronic device, transmitting the request to start the new virtual session to the login endpoint with the first authentication request.

7. The method of claim 5 further comprising, by the virtual session manager of the second electronic device:

in response to receiving the request to start a new virtual session, generating a prompt for the user to present an access credential to the second electronic device;

receiving the access credential via a user interface of the second electronic device;

confirming that the access credential authorizes the user to access the first web resource; and in response to receiving the access credential and confirming that the access credential authorizes the user to access the first web resource, transmitting the request to start the new virtual session to the endpoint device with the first authentication request.

8. The method of claim 1 further comprising, by the user agent of the first electronic device:

when the first access token expires or is about to expire, transmitting a re-authentication request to the endpoint device via the second electronic device so that the virtual session manager of the second electronic device can present the re-authentication request with the grant token to the endpoint device without the first electronic device having any access to the grant token;

receiving an updated access token from the endpoint device via the second electronic device, wherein the updated access token replaces the first access token and has a life that is shorter than the life of the grant token; and using the updated access token to maintain the virtual session.

9. The method of claim 1 further comprising, by the virtual session manager of the second electronic device, presenting the user an interface via which the user may command the virtual session manager to do one or more of the following:

disable the virtual session, in which case the virtual session manager will cease obtaining access tokens for the virtual session;

re-enable a disabled virtual session; in which case the virtual session manager will grant an updated access token for the disabled virtual session to all electronic devices for which the virtual session manager previously disabled access;

re-group a virtual session, in which case the virtual session manager will identify an alternate virtual session for which it has a grant token, send the grant token for the alternate virtual session to the endpoint device, receive an alternate access token from the endpoint device, and transmit the alternate access token to the first electronic device so that the first electronic device will replace the first access token with the alternate access token and use the alternate access token to connect to the alternate virtual session;

delete the virtual session, in which case the virtual session manager will delete the grant token; or remove the first electronic device, in which case the virtual session manager will disable the first access token and prevent the first electronic device from receiving additional access tokens until the virtual session manager receives a valid authentication credential.

10. The method of claim 1, further comprising, by the user agent:

prompting the user to perform a known user action;

in response to detecting the known user action, obtaining a user presence token; and transmitting the user presence token to the first web resource with the first access token when establishing the virtual session with the first web resource.

11. A method of maintaining a web session for a user across multiple electronic devices, the method comprising:

by a virtual session manager of a second electronic device:

receiving, from a first electronic device that is in a communication range of the second electronic device, a first authentication request, wherein the first authentication request comprises a request to access a first web resource, and wherein a plurality of electronic devices including the second electronic device was discovered by the first electronic device and identifiers associated with each of the discovered plurality of electronic devices, including an identifier of the second electronic device, were presented to the user by the first electronic device;

transmitting the first authentication request to an endpoint device;

if the first authentication request comprises a request to connect to an existing session with the first web resource including a grant token when transmitting the first authentication request to the endpoint device, otherwise receiving the grant token from the endpoint device for a new session, and in either case not providing the first electronic device with any access to the grant token;

receiving, from the endpoint device, a first access token in response to the first authentication request, wherein the first access token:

has a life that is shorter than a life of the grant token such that the grant token is relatively long-lived and the first access token is relatively short-lived, and is configured to grant a user access to the first web resource; and transmitting the first access token to the first electronic device so that the first electronic device can establish or connect to a virtual session with the first web resource, wherein one or more parameters associated with the user's use of the first web resource are sent to the first electronic device so that the first electronic device can reconnect to the first web resource as a continuation of a previous virtual session.

12. The method of claim 11 further comprising, by the virtual session manager of the second electronic device when the first authentication request comprises a request to connect to an existing session:

identifying the one or more parameters, the one or more parameters being associated with the user's use of the first web resource at a time when the grant token was previously transmitted to the endpoint device.

13. The method of claim 12 further comprising, by the virtual session manager of the second electronic device:

outputting identifiers for a plurality of virtual sessions for the first web resource, each of which has a corresponding grant token;

receiving, via a user interface of the second electronic device, a selection of one of the virtual sessions; and transmitting, to the endpoint device with the first authentication request, a request to connect to the selected virtual session, wherein the grant token that is presented to the endpoint device is the grant token that corresponds to the selected virtual session.

14. The method of claim 11 further comprising, by the virtual session manager of the second electronic device:

outputting identifiers for a plurality of available virtual sessions for the first web resource;

receiving, via a user interface of the second electronic device, a request to start a new virtual session rather than connect to any of the available virtual sessions; and identifying the grant token as a new grant token for the new virtual session, and storing the new grant token in a memory of the second electronic device.

15. The method of claim 14 further comprising, by the virtual session manager of the second electronic device when the first authentication request does not comprise a request to connect to an existing session:

generating a prompt for the user to present an access credential to the second electronic device;

receiving the access credential via a user interface;

confirming that the access credential authorizes the user to access the first web resource; and in response to receiving the access credential and confirming that the access credential authorizes the user to access the first web resource, including a request to start a new virtual session when transmitting the first access request to the endpoint device.

16. The method of claim 11 further comprising, by the virtual session manager of the second electronic device:

when the first access token expires or is about to expire, receiving a re-authentication request;

presenting the re-authentication request with the grant token to the endpoint device without the first electronic device having any access to the grant token;

receiving an updated access token from the endpoint device, wherein the updated access token:

is configured to replace the first access token and enable the user to maintain the virtual session, and has a life that is shorter than the life of the grant token; and transmitting the updated access token to the first electronic device.

17. The method of claim 11 further comprising, by the virtual session manager of the second electronic device, presenting the user an interface via which a user may command the virtual session manager to do one or more of the following:

disable the virtual session, in which case the virtual session manager will cease obtaining access tokens for the virtual session;

re-enable a disabled virtual session, in which case the virtual session manager will grant an updated access token for the disabled virtual session to all electronic devices for which the virtual session manager previously disabled access;

re-group a virtual session, in which case the virtual session manager will identify an alternate virtual session for which it has a grant token, send the grant token for the alternate virtual session to the endpoint device, receive an alternate access token from the endpoint device, and transmit the alternate access token to the first electronic device so that the first electronic device will replace the first access token with the alternate access token and use the alternate access token to connect to the alternate virtual session;

delete the virtual session, in which case the virtual session manager will delete the grant token for the virtual session; or remove the first electronic device, in which case the virtual session manager will disable the first access token and prevent the first electronic device from receiving additional access tokens until the virtual session manager receives a valid authentication credential.

18. The method of claim 11 further comprising, by the virtual session manager:

receiving an identifier of a user action;

determining whether the user action matches an expected action;

in response to detecting that the user action matches the expected action, generating a user presence token, wherein the user presence token has a life that is no longer than that of the first access token; and transmitting the user presence token to the first electronic device.

19. The method of claim 11 further comprising, by the virtual session manager:

before transmitting the first access token to the first electronic device, also determining whether one or more additional rules are satisfied; and only transmitting the first access token to the first electronic device if and after confirming that the one or more additional rules are satisfied.

20. A method of maintaining a web session for a user, comprising:

by one or more endpoint devices:

receiving a first authentication request, wherein:

the first authentication request comprises a request by a user agent of a first electronic device that is being used by a user to access a first web resource, and the first authentication request is received from a second electronic device rather than the first electronic device;

determining that the second electronic device includes a virtual session manager for the user and that the virtual session manager includes a grant token and the first electronic device does not have access to the grant token, and wherein a plurality of electronic devices including the second electronic device was discovered by the first electronic device and identifiers associated with each of the discovered plurality of electronic devices, including an identifier of the second electronic device, were presented to the user by the first electronic device;

confirming that the grant token is valid; and transmitting a first access token to the second electronic device, wherein the first access token is configured to grant the user agent access to the first web resource, and wherein one or more parameters associated with the user's use of the first web resource are sent to the first electronic device so that the first electronic device can reconnect to the first web resource as a continuation of a previous virtual session.

21. The method of claim 20, wherein determining that the virtual session manager includes the grant token comprises receiving the grant token with the first authentication request.

22. The method of claim 21 further comprising, by the one or more endpoint devices:

when the first access token expires or is about to expire, receiving a re-authentication request and the grant token from the second electronic device;

confirming that the grant token is still valid, and sending an updated access token to the second electronic device, wherein the updated access token is configured to replace the first access token and enable the user agent to maintain access to the first web resource.

* * * * *